(12) United States Patent
Pundole

(10) Patent No.: US 12,152,471 B2
(45) Date of Patent: Nov. 26, 2024

(54) SINGULAR/WIRED FUZING DEVICE

(71) Applicant: Faraidoon Pundole, Sugar Land, TX (US)

(72) Inventor: Faraidoon Pundole, Sugar Land, TX (US)

( * ) Notice: Subject to any disclaimer, the term of this patent is extended or adjusted under 35 U.S.C. 154(b) by 0 days.

(21) Appl. No.: 18/250,926

(22) PCT Filed: Oct. 27, 2021

(86) PCT No.: PCT/US2021/056785
§ 371 (c)(1),
(2) Date: Apr. 27, 2023

(87) PCT Pub. No.: WO2022/093913
PCT Pub. Date: May 5, 2022

(65) Prior Publication Data
US 2023/0392481 A1 Dec. 7, 2023

Related U.S. Application Data

(60) Provisional application No. 63/106,740, filed on Oct. 28, 2020.

(51) Int. Cl.
*E21B 43/1185* (2006.01)
*E21B 47/12* (2012.01)
(Continued)

(52) U.S. Cl.
CPC .......... *E21B 43/1185* (2013.01); *E21B 47/12* (2013.01); *F42D 1/05* (2013.01); *F42D 1/055* (2013.01)

(58) Field of Classification Search
CPC ...... F42D 1/055; E21B 43/1185; E21B 47/12; E21B 43/11857
See application file for complete search history.

(56) References Cited

U.S. PATENT DOCUMENTS 5,977,806 A * 11/1999 Kikuchi ................ H03L 7/0805
331/2
8,884,778 B2 * 11/2014 Lerche ................ E21B 41/0021
166/255.2
(Continued)

FOREIGN PATENT DOCUMENTS

WO 2022093913 A1 5/2022

OTHER PUBLICATIONS

International Search Report and Written Opinion dated Jan. 26, 2022, PCT/US2021/056785 filed on Oct. 27, 2021.
(Continued)

*Primary Examiner* — Daniel P Stephenson
(74) *Attorney, Agent, or Firm* — Conley Rose, P.C.

(57) ABSTRACT

Aspects of the disclosure provide for a fuzing device. In some examples, the fuzing device includes an energy bridge, an uplink controller, a downlink controller, and a microcontroller. The microcontroller is coupled to the energy bridge, the uplink controller, and the downlink controller. The microcontroller is configured to receive downlink messages from a control unit via the downlink controller, selectively power the energy bridge according to at least some of the downlink messages to initiate a controlled energetic reaction, and send uplink messages to the control unit via the uplink controller.

19 Claims, 3 Drawing Sheets

(51) Int. Cl.
  *F42D 1/05* (2006.01)
  *F42D 1/055* (2006.01)

(56) References Cited

U.S. PATENT DOCUMENTS

| | | | |
|---|---|---|---|
| 10,767,453 B2* | 9/2020 | Phelps | F42D 1/055 |
| 11,215,433 B2* | 1/2022 | Zemla | F42B 3/122 |
| 11,994,008 B2* | 5/2024 | Anthony | E21B 43/117 |
| 2004/0108114 A1* | 6/2004 | Lerche | E21B 47/12 |
| | | | 166/302 |
| 2005/0285686 A1 | 12/2005 | Pettersen | |
| 2010/0286800 A1* | 11/2010 | Lerche | E21B 47/13 |
| | | | 702/6 |
| 2012/0168226 A1 | 7/2012 | Brooks | |
| 2014/0151018 A1 | 6/2014 | Lerche | |
| 2014/0261039 A1 | 9/2014 | Koekemoer | |
| 2020/0355482 A1* | 11/2020 | Lopez De Cardenas | E21B 43/117 |
| 2023/0392481 A1* | 12/2023 | Pundole | F42D 1/05 |

OTHER PUBLICATIONS

Rose, "Connecting Power Supplies in Parallel or Series for Increased Output Power", CUI Inc., Jun. 16, 2020, retrieved on [Dec. 20, 2021]. Retrieved from the internet, URL: https://www.cui.com/blog/power-supplies-in-series-or-parallel-for-increased-power.

Surplus Sales of Nebraska, "10 kv to 39 kv Power Supplies", surplussales.com, Sep. 26, 2020, retrieved on [Dec. 20, 2021]. Retrieved from the internet, URL: https://web.archive.org/web/20200926233927/https://www.surplussales.com/POWERSUPPLIES/POWERS-8-1.HTML.

International Preliminary Report on Patentability dated May 11, 2023, PCT/US2021/056785 filed on Oct. 27, 2021.

EP Rule 161/162 Communication dated Jun. 6, 2023, European Application No. 21887409.7 filed Oct. 27, 2021.

* cited by examiner

SINGULAR/WIRED FUZING DEVICE

CROSS-REFERENCE TO RELATED APPLICATIONS

The present application is a filing under 35 U.S.C. 371 as the National Stage of International Application No. PCT/US2021/056785, filed on Oct. 27, 2021, entitled, "SINGULAR/WIRED FUZING DEVICE," which claims the benefit of and claims priority to U.S. Provisional Application No. 63/106,740 filed on Oct. 28, 2020 and entitled "Singular/Wired Fuzing Device," both of which are incorporated herein by reference in their entirety for all purposes.

BACKGROUND

Oil and gas tools are used to complete oil and gas wells by performing certain tasks inside a well bore at a certain depth in order to facilitate the flow of hydrocarbons into the wellbore. Such operations involve multiple tools at different producing zones at different depths where it may be required to control distinct functions separately. These tools are usually brought to the producing zone(s) by wireline, tubing or downhole tractors.

Similarly, various other types of tools used in industries such as mining, demolition, pyrotechnics, and the like also rely on the operation of several types of tools in series. While these tools are not disposed within a wellbore, they are often arranged over large distances to place the user at a distance from the tools.

SUMMARY

Aspects of the disclosure provide for a fuzing device. In some examples, the fuzing device includes an energy bridge, an uplink controller, a downlink controller, and a microcontroller. The microcontroller is coupled to the energy bridge, the uplink controller, and the downlink controller. The microcontroller is configured to receive downlink messages from a control unit via the downlink controller, selectively power the energy bridge according to at least some of the downlink messages to initiate a controlled energetic reaction, and send uplink messages to the control unit via the uplink controller.

Other aspects of the disclosure provide for a method. In some examples, the method includes receiving, via a downlink controller, downlink messages from a control unit, the downlink messages including a command. The method also includes, responsive to the command, charging an energy storage element. The method also includes selectively discharging the energy storage element through an energy bridge. The method also includes, via an uplink controller, uplink messages to the control unit.

DETAILED DESCRIPTION

Figure 1:
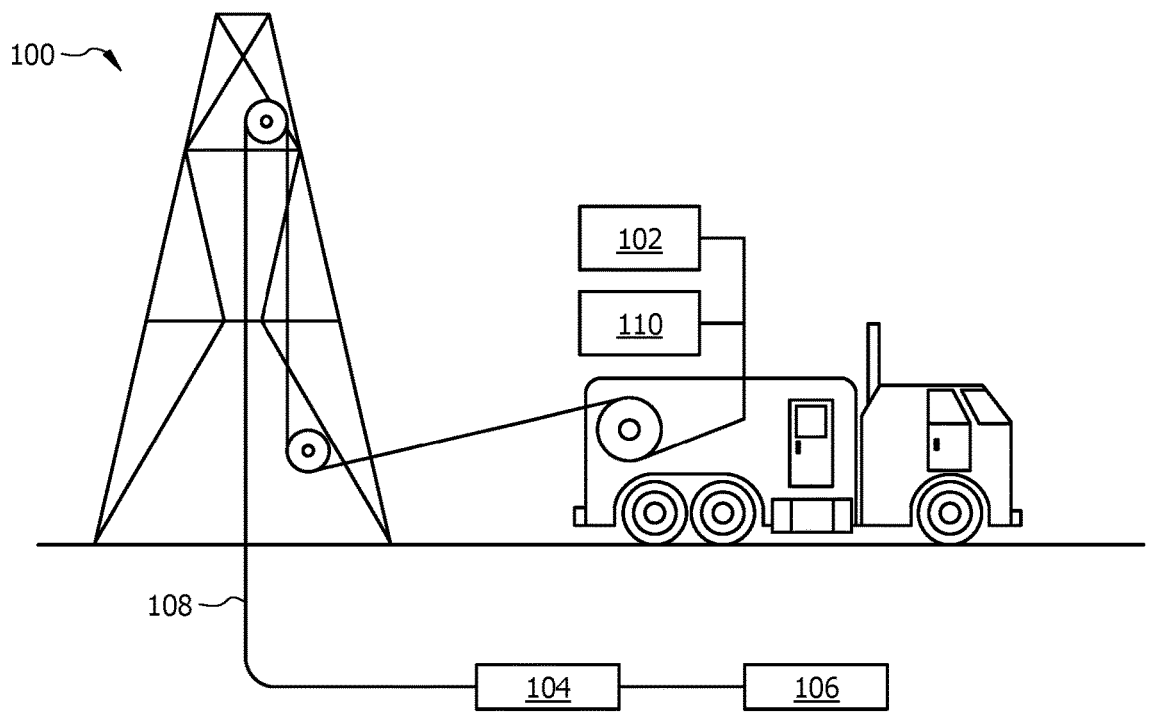
FIG. 1 is a diagram of a system in accordance with various examples.

Various devices are implemented remote to a user or controller of the remote devices. However, for the user to maintain control of a remote device, a control system in proximity to the user maintains communicative connectivity to the remote device. In some examples, the connectivity is implemented as a wireline or physical connection, providing reliable communication between the control system and the remote device. In at least some examples, the wireline is of a length such that losses or other alterations to a signal transmitted on the wireline occur between opposite ends of the wireline. Also in at least some examples, the wirelines passes through, or into, an environment such that losses or other alterations to a signal transmitted on the wireline occur between opposite ends of the wireline (e.g., such as when the wirelines passes through, or into, areas having vastly varying temperatures between opposite ends of the wireline).

In various examples, the remote devices are control and/or telemetry devices. One such control device is a switch circuit for controlling a flow of current to a downstream device for which the switch is an intermediary between the downstream device and the control device. The switch circuit is, for example, a safety circuit that prevents an unintentional passage of current between input and output terminals of the switch circuit. In this sense, the switch circuit is, in some examples, implemented as a blocking device to block the transfer of power between two points coupled to respective input and output terminals of the switch circuit. The switch circuit may also include at least some telemetry functionality. For example, the switch circuit may capture and transmit voltage, current, temperature, or other measurements to the control system. Such remote devices may be implemented in situations in which it is advantageous, or preferred, for the user to remain physically distant from the remote devices. For example, a remote device may be implemented between a user and a downstream tool or device that is a detonation charge, such as in mining, demolition, wellbore perforation, or other situations in which it may be dangerous or disadvantageous for a user to be in proximity of the detonation charge. In other examples, the remote device may be implemented between the user and a downstream tool that is not inherently dangerous such as a detonation charge, but is located inconveniently for facilitating physical proximity of the user to the downstream device.

In a particular implementation example, a perforating gun or other explosive charge or explosive charge providing device is selectively disposed and used inside a wellbore to facilitate a flow of hydrocarbons into the wellbore. For example, the perforating gun directs an explosive charge into a casing of the wellbore in one or more locations, perforating the casing in at least some of the one or more locations and facilitating the flow of hydrocarbons into the wellbore through the perforations in the casing of the wellbore. While the example of a perforating gun, a wellbore, and more generally oil field uses and implementations of the present disclosure are described herein, the present disclosure is not limited to only these implementations, as discussed above. For example, the systems and methods disclosed herein may also be used in mining and demolition settings.

To control detonation of the explosive charge of the perforating gun, a remote device can be implemented between a user controlling a control system and the perforating gun. The remote device is, in some examples, a switch as described above that enables the user to transmit a control signal from the control system to control when current is provided, via the switch, to the perforating gun to enable or facilitate detonation of the explosive charge or communication with the perforating gun by the remote device and/or the control system.

As a specific example in the oilfield context of the uses described above, a switch can be used in conjunction with each detonator or ignitor in a string of perforating guns to select and determine a sequence of firing. There are distinct types of switches such as a diode switch that allows two guns (or a gun and a plug) to be fired, one with positive and the other with negative voltage. Another type is a percussion switch that uses the force of detonation of one gun to connect electrically to the next gun starting from the bottom gun and working up. These switches are used to selectively fire three or more guns. These devices also electrically disconnect a fired gun thereby preventing electrical shorting. A problem with these switches is that in the event any switch fails to actuate, the firing sequence cannot continue, and the string must be pulled out from the well bore, redressed and run again.

Nowadays another type of communicable electronic switch is used, that has the ability of bidirectional communication and has no limitations to the number of guns that can be fired in a run. Multiple switches may be disposed along a wireline and be uniquely addressable and controllable via the uplink and downlink communication capabilities to facilitate unique control of multiple perforating guns. However, wiring of the remote device, the electronic switch, and/or a detonator of the remote device, may become damaged, may be induced with radio frequency signals at various frequencies, and the like, which may lead to a buildup of energy in the wiring and premature or unintended firing of the perforating gun. Such unintended firing may be detrimental in that it may be an off-depth perforation in a wellbore, or may cause injury or have other unintended consequences in a mining or demolition setting.

At least some aspects of the disclosure provide for a remote device, as described above. The remote device is, in some examples, a switch circuit as described above. The remote device can be configured to be located remotely to a controller, such as the control system described above. In at least some examples, the remote device operates as a blocking device on a wireline, selectively blocking or allowing passage of voltage and current from the control system located upstream to the remote device to a downstream device located downstream to the remote device. The remote device, in some examples, receives a control signal from the control system and determines data included in the control signal. The data is, in some examples, encoded into the control signal according to frequency-shift keying (FSK). Based on the data of the control signal, the remote device may permit or deny a flow of power and/or the control signal (or another control signal) from the control system to the downstream device. Further based on the data, the remote device may control a detonator to fire a perforating gun. The remote device may isolate the detonator from a high power portion of the remote device to reduce the chances of an unintentional activation of the detonator and firing of the perforating gun. In at least some examples, the remote device interacts with the detonator via printed circuit board (PCB) traces, thereby mitigating potential for damage to conductors of the remote device and unintentional activation of the detonator and firing of the perforating gun. The remote device may include a data storage device that independently stores a status (e.g., on or off, closed or open, etc.) of a switch or switches of the remote device, where in the event of a mismatch between the status stored in the redundant data store, the remote devices fails to a safe state in which the switch is controlled to be off. In some examples, the remote device provides upstream communication to the control system via a Manchester encoded pattern, encoded onto the wirelines coupling the remote device to the control system.

The systems and methods described herein can also apply to electronic blasting systems used in various industries such as mining, demolition, engineering, building removal systems, etc. In general, these systems are similar to wellbore perforating systems in the use of a communication system that can selectively control the detonation of one or more charges. For example, in the mining industry, the electronic detonators are used to fire the charges, and the electronic detonators can be programmable to achieve a desired firing sequence. The electronic detonators can be in communication with logging and control equipment over a communication link. In order to implement a desired blast design and initiate a blast according to that design, the various components of the system can communicate with each other over the communication links as required. The communication link can be wireless or wired, for example using wires, plugs, connectors, adaptors, and the like. The detonators in such industries may be susceptible to unintentional firing in the same manner as the oil and gas industry, as described above.

An object of the present description is to provide a system that does not connect an external detonator to a wireline and isolates an energetic element such as the energy bridge of the remote device from any high power section that may have a potential for causing unintentional activation of the detonator. For example, the remote device may not allow any direct electrical connection between a wireline and an energy bridge, which in turn isolates the wireline/wireline power from the fuse. Rather in some aspects, the energy can be generated using a square wave and multiplied to charge a capacitor or inductor which arms the device. The device can then be discharged upon receiving a command. The remote device may interact with the external detonator via radiated energy, such as by providing current to an etched element (e.g., a trace) of a printed circuit board to cause the etched element to radiate energy in the form of heat to detonate the detonator. This is advantageous by eliminating any direction connection with the power source, which can inadvertently trigger the device, and also can place the energy bridge on the chip itself, which can reduce the possibility of inductive activation in a wire between the remote device and the detonation fuse.

Also provided is a fuzing device that includes an energy bridge; an uplink controller; a downlink controller; and a microcontroller coupled to the energy bridge, the uplink controller, and the downlink controller, the microcontroller configured to: receive downlink messages from a control unit via the downlink controller; selectively power the energy bridge according to at least some of the downlink messages to initiate a controlled energetic reaction; and send uplink messages to the control unit via the uplink controller.

Also provided is a method for receiving, via a downlink controller, downlink messages from a control unit, the downlink messages including a command; responsive to the command, charging an energy storage element; selectively discharging the energy storage element through an energy bridge; and sending, via an uplink controller, uplink messages to the control unit.

While the systems and method described herein are described in terms of a wellbore environment, the same systems and methods can apply to other uses and industries such as the mining and engineering industries. For example, the potential for damage and unintentional detonation or firing in downhole units is equivalent to the potential for damage and unintentional detonation or firing in end units in mining, such as programmable detonators. In addition, the form factor for the end units and communication equipment may be different, but the same communication and operating principles described herein still apply.

Referring now to FIG. 1, a diagram of an example system 100 is shown in accordance with aspects of the disclosure. The system 100 is representative of a hydrocarbon drilling implementation of the disclosure. However, as discussed above, the teachings of the disclosure are equally applicable to other implementations, such as mining, demolition, fireworks detonation, remote release mechanisms, etc. The system 100 includes a control system 102, a remote device 104, and a downstream device 106. The control system 102 is, in some examples, implemented on a vehicle, such as a vehicle that includes a wireline 108 on which the remote device 104 and the downstream device 106 are disposed. Although the system 100 illustrates only one remote device 104 and one downstream device 106, in various examples the system may include any number of remote devices 104 and/or downstream devices 106 disposed in any arrangement along the wirelines 108. In some examples, the remote device 104 is referred to as a fuzing device. A fuzing device is a device that is configured to detonate, or cause detonation, of explosive material under certain programmed, controlled, or otherwise specified conditions.

In at least some examples, the control system 102 is configured to provide power and/or a control signal to the downstream device 106. The remote device 104 is disposed on the wireline 108 in series between the control system 102 and the downstream device 106 and is configured to selectively block, or permit, passage of the power and/or control signal provided by the control system 102 to the downstream device 106. In at least some examples, an operating frequency of the remote device 104 varies from a frequency of data transmission of the control system 102. In such examples, the control system 102 may determine the operating frequency of the remote device 104 and match or synchronize a frequency of the control signal transmitted by the control system 102 to the remote device 104. For example, the control system 102 may receive a signal from the remote device 104 and measure a time base of the received signal. When the time base of the received signal varies from a time base of the control system 102, the control system 102 may modify its time base to match or synchronize with the time base determined from the received signal. For example, the control system 102 may perform term frequency scaled shift keying (FSSK) to shift mark and space frequencies of the FSSK control signal based on the detected time base variance of the received signal.

Further, in at least some examples, communication channels, such as the wireline 108, can include characteristics that cause the communication channels to function in part as a filter, such as a low pass filter. This filtering behavior may attenuate the control signal transmitted by the control system 102 to the remote device 104, degrading communication between the control system 102 and the remote device 104. For example, transition boundaries between marks and spaces of the FSSK control signal may be altered by the filtering of the wireline 108. To compensate for and reduce the effect of this alteration, in some examples, the control system 102 modifies the amplitude of the control signal.

The remote device 104, in at least some examples, receives a power signal from the control system 102. The power signal, in some examples, includes the control signal, encoded according to FSSK, or any other suitable encoding mechanism, superimposed on the power signal. In some examples, the power signal is an alternating current (AC) signal. In other examples, the power signal is a direct current (DC) signal of positive or negative polarity (e.g., such that the remote device 104 is power signal polarity agnostic). At least some implementations of the remote device 104 are configured to detect the control signal and convert the control signal to a square wave or other form of data signal. The control signal, and the resulting data signal, may include a plurality of binary data bits. Based on look-up tables or other programming of the remote device 104, the remote device 104 may control one or more switches to permit, or deny, power received by the remote device 104 from the control system 102 to pass to the downstream device 106 via the wireline 108. In some examples, the remote device 104 may further transmit control signals to, or receive signals from, the downstream device 106. In yet further examples, the remote device 104 may determine sensor feedback, such as voltage and/or temperature feedback. The remote device 104 may generate a response signal and transmit the response signal via the wireline 108 to the control system 102. For example, the remote device 104 may encode the response signal onto the wireline 108 via Manchester encoding, such as described in Institute of Electrical and Electronics Engineers (IEEE) standard 802.3, which is incorporated herein by reference. Manchester encoding, as described in IEEE 802.3, is a return to zero communication protocol in which a binary 1 is represented by a high to low transition in a signal and a binary 0 is represented by a low to high transition in the signal. Other forms of Manchester encoding may represent a binary 1 as a low to high transition in a signal and a binary 0 as a high to low transition in the signal.

The remote device 104 may include an element capable of radiating energy. For example, responsive to a command received via the control signals to detonate a charge of the downstream device 106, or of another device in the system 100, the remote device 104 may radiate energy via etched traces of a printed circuit board of the remote device 104. The remote device 104 may radiate the energy in the form of heat, by providing an amount of current to the etched traces to cause the etched traces to emit heat. The heat may cause a detonator to detonate the charge.

In at least some examples, the system 100 also includes a test system 110. The test system 110, in some examples, is configured to test functionality of the remote device 104. The test system 110 operates substantially similar to the control system 102, but at lower voltages, and is discussed in greater detail below.

Figure 2:
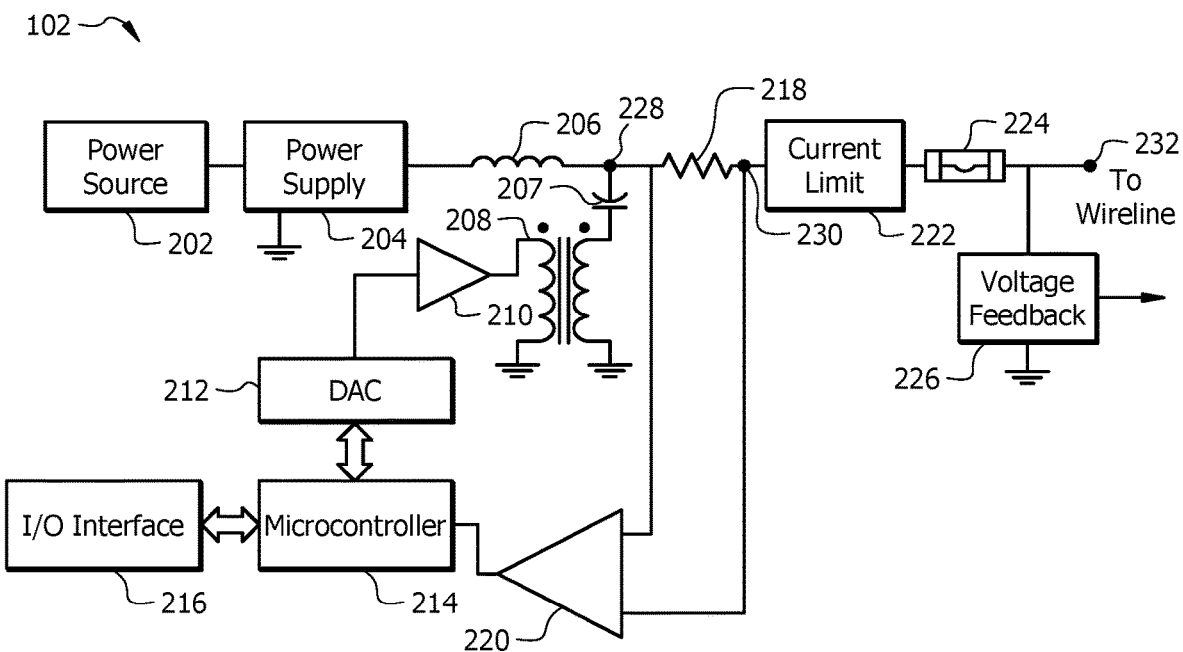
FIG. 2 is a schematic diagram of a control system in accordance with various examples.

Referring now to FIG. 2, an example schematic diagram of the control system 102 is shown in accordance with aspects of the disclosure. In at least some examples, the control system 102 is referred to as a surface communication unit. The control system 102, in at least some examples, includes a power source 202, a power supply 204, an inductor 206, a capacitor 207, a transformer 208, an amplifier 210, a digital-to-analog converter (DAC) 212, a microcontroller 214, an input/output (I/O) interface 216, a resistor 218, a differential amplifier 220, a current limit circuit 222, a fuse 224, and a voltage feedback circuit 226. In at least some implementations of the control system 102, the current limit circuit includes a plurality of transistors, such as NPN transistors, that drop voltage across each of the transistors as current flowing through the transistors increases. The voltage feedback circuit 226, in some examples, includes a voltage divider followed by a buffer such that an output signal of the voltage feedback circuit 226 is a scaled representation of an input signal of the voltage feedback circuit 226. In an example architecture of the control system 102, the power source 202 is coupled to the power supply 204. The inductor 206 is coupled between the power supply 204 and a node 228. The capacitor 207 is coupled between the node 228 and a second winding of the transformer 208. The resistor 218 is coupled between the node 228 and a node 230. The current limit circuit 222 and the fuse 224 are coupled in series between the node 230 and a node 232. The voltage feedback circuit 226 is coupled to the node 232. The node 232 is, in some examples, an I/O node or terminal of the control system 102. In at least some examples, the control system 102 couples to the wirelines 108 at the node 232. The differential amplifier 220 has a first input coupled to the node 228, a second input coupled to the node 230, and an output coupled to the microcontroller 214. The microcontroller 214 is further coupled to the I/O interface 216. Although only one I/O interface 216 is shown in FIG. 2, in various examples the microcontroller 214 may couple to any number of I/O interfaces 216, such as graphical user interfaces, user input devices, communication devices such as Universal Serial Bus communication interfaces, etc. The microcontroller 214 is further coupled to the DAC 212, which has an output coupled to an input of the amplifier 210. The amplifier 210 has an output coupled to a first winding of the transformer 208. Although not shown in FIG. 2, in at least some examples, an output of the voltage feedback circuit 226 is coupled to an input of the microcontroller 214. In other examples, the output of the voltage feedback circuit 226 is coupled to any suitable component for monitoring voltages in, or operation of, the control system 102.

In an example of operation of the control system 102, a power signal is provided by the power source 202 to the power supply 204. The power source 202, in at least some examples, provides power in a voltage range of about 6 V to about 18 V to the power supply 204. The power supply 204 is, in some examples, a power converter that increases or decreases a voltage of the power received from the power source 202. For example, in at least some implementations the power supply 204 is a boost power converter that boosts or increases the received voltage in the range of about 6 V to 18 V to a range of about 20 V to 70 V based on configuration of the power supply 204. In other examples, the power supply 204 may increase, or decrease, the voltage to any suitable value in any suitable range for a use case of the control system 102. In at least some examples, a voltage output by the power supply 204 may be determined at least in part according to voltage needs of a remote device or downstream device with which the control system 102 will communicate (e.g., such as the remote device 104 and/or the downstream device 106, each of FIG. 1) and/or a length of a wireline (and therefore voltage losses associated with the wirelines) over which the control system 102 will communicate with the remote device or downstream device.

The microcontroller 214, based at least in part on an input signal received via the I/O interface 216 and/or the differential amplifier 220, generates a data output signal and transmits that data output signal in a digital domain (e.g., as a series of discreet data bits) to the DAC 212, which converts that data output signal into an analog domain (e.g., as a sinusoidal, or sine, wave) and transmits the data output signal to the amplifier 210. The data output signal is, in some examples, a signal for interacting with a remote device such as the remote device 104 and/or the downstream device 106, each of FIG. 1. The data output signal may include an address of a device (or devices) to which the data output signal is addressed and one or more commands for the device(s). The amplifier 210 receives the data output signal and amplifies a value of the data output signal. In some examples, the amplifier 210 is a current amplifier that increases a value of the data output signal prior to providing the data output signal to a first winding of the transformer 208. The sine wave, in some examples, has a frequency and an amplitude that is programmable, such as by altering operating characteristics of the microcontroller 214, the DAC 212, and/or the amplifier 210.

The transformer 208 is configured as an impedance matching transformer to adapt to match an impedance at an output of the amplifier 210 to an impedance present at the node 228. A turns ratio of the first winding of the transformer 208 to the second winding of the transformer 208 is configured to match the impedance at the output of the amplifier 210 to the impedance present at the node 228 and determines a voltage of the data output signal as output by the second winding of the transformer 208. The capacitor 207 is a coupling capacitor that couples the data output signal output by the transformer 208, as an AC signal, to the node 228 while blocking any DC component of the data output signal. The data output signal as provided at the node 228 is, in some examples, referred to herein as a control signal and is imposed on a power signal, as described above with respect to FIG. 1. The inductor 206, in at least some examples, prevents or blocks the control signal, based on the AC nature of the control signal, from flowing to the power supply 204 and potentially damaging or altering operation of the power supply 204.

The control signal is superimposed on the voltage output by the power supply 204 and flows through the resistor 218. A voltage drop occurs between the node 228 and the node 230 due to an impedance of the resistor 218. Accordingly, in at least some implementations, the resistor 218 is referred to as a current viewing resistor. The difference in voltages present at the node 228 and the node 230 is sensed by the differential amplifier 220 and provided to the microcontroller 214 as feedback. The microcontroller 214 may use the feedback for any suitable purpose, such as determining whether the control system 102, or any of its components are operating properly.

The current limit circuit 222 is configured to monitor a current flowing from the node 230 to the node 232 to determine whether a value of the current exceeds a safe level for one or more other devices coupled to the control system 102, such as the remote device 104 and/or the downstream device 106, each of FIG. 1. The fuse 224 is similarly configured to respond to a current flowing through the fuse 224 exceeding a rated value for the fuse 224 by creating an open circuit, or electrical disconnection, in the control system 102 in place of the fuse 224. The voltage feedback circuit 226, in at least some examples, monitors the node 232 to provide feedback indicating a voltage that is present at the node 232. The feedback, in some examples, indicates whether the control system 102 is operating properly.

As discussed above, in at least some examples, the control signal is encoded according to FSSK. For example, a first portion of the control signal that represents a value of digital logic "1" or high value has a first frequency and a second portion of the control signal that represents a value of digital logic "0" or low value has a second frequency. In at least one implementation of the control system 102, the first frequency is about 5500 Hertz (Hz) and the second frequency is about 3000 Hz. In such an example, the control signal has a baud rate of about 500 bits/second, or a bit time of about 2.0 milliseconds. In at least some examples, a device receiving the control signal is configured to communicate and/or operate at a substantially same frequency as the control system 102 and the control signal. However, as discussed above, in some circumstances the control system 102 may be in communication with a device, such as the remote device 104 of FIG. 1, that may be operating at a different frequency as a result of environmental conditions (such as temperature) surrounding the device. In such an example, an oscillator crystal of the device may slow, resulting in a decrease in operating frequency of the device. This decrease in operating frequency may introduce errors into communication between the control system 102 and the device, such that the device misinterprets the control signal.

To compensate for this variation in frequency, the control system 102 may measures a time base of a signal received from the device. For example, the control system 102 may determine the time base of the signal received from the device based on feedback provided to the microcontroller 214 by the differential amplifier 220 based on changes in voltage detected across the resistor 218. The microcontroller 214 may compare the detected time base to an expected or programmed time base and determine whether a variation exists between the detected time base and the expected or programmed time base. When a variation exists, the microcontroller 214 may modify generation of the data output signal to cause the control signal as provided at the node 228 to be at a frequency synchronized (e.g., approximately the same as) the operating frequency of the device. In at least some examples, the microcontroller 214 modifies generation of the data output signal, or generates the data output signal, according to FSSK.

In at least some examples, the control system 102 is modified to create the test system 110. In some implementations, the test system 110 is referred to as a surface check system. In implementations of the control system 102 modified to form the test system 110, the power source 202 may be implemented as a battery, for example, to facilitate portability and to provide a limited amount of power, such as may be insufficient to detonate an explosive device with which the test system 110 communicates. The power supply 204 may be programmed to provide no more than a preset amount of current, such as, in some examples, about 15 milliamps. The current limit circuit 222 may be implemented as a pair of redundant, series-connected current limit and trip circuits. The current limit and trip circuits, in at least some examples, an integrated circuit or other component that measures a voltage drop, such as across a resistor, and generates an output signal that controls a switch. The output signal may become asserted when the integrated circuit determines based on the measured voltage drop that a current flowing through the current limit and trip circuit has exceeded a programmed value. The switch, when activated based on the asserted output signal, changes states to prevent the excessive current from flowing out from the test system 110. In this way, the test system 110 may be safely used to test live explosives, or other potentially dangerous devices, in a safe manner resulting at least partially from the current limit and trip circuits preventing current sufficient to trigger the dangerous devices from detonating or otherwise disadvantageously activating. In at least some examples, the test system 110 includes multiple redundant safety measures such that it has no single failure point that, if failed, would allow an uncontrolled amount of current to pass out from the test system 110.

Figure 3:
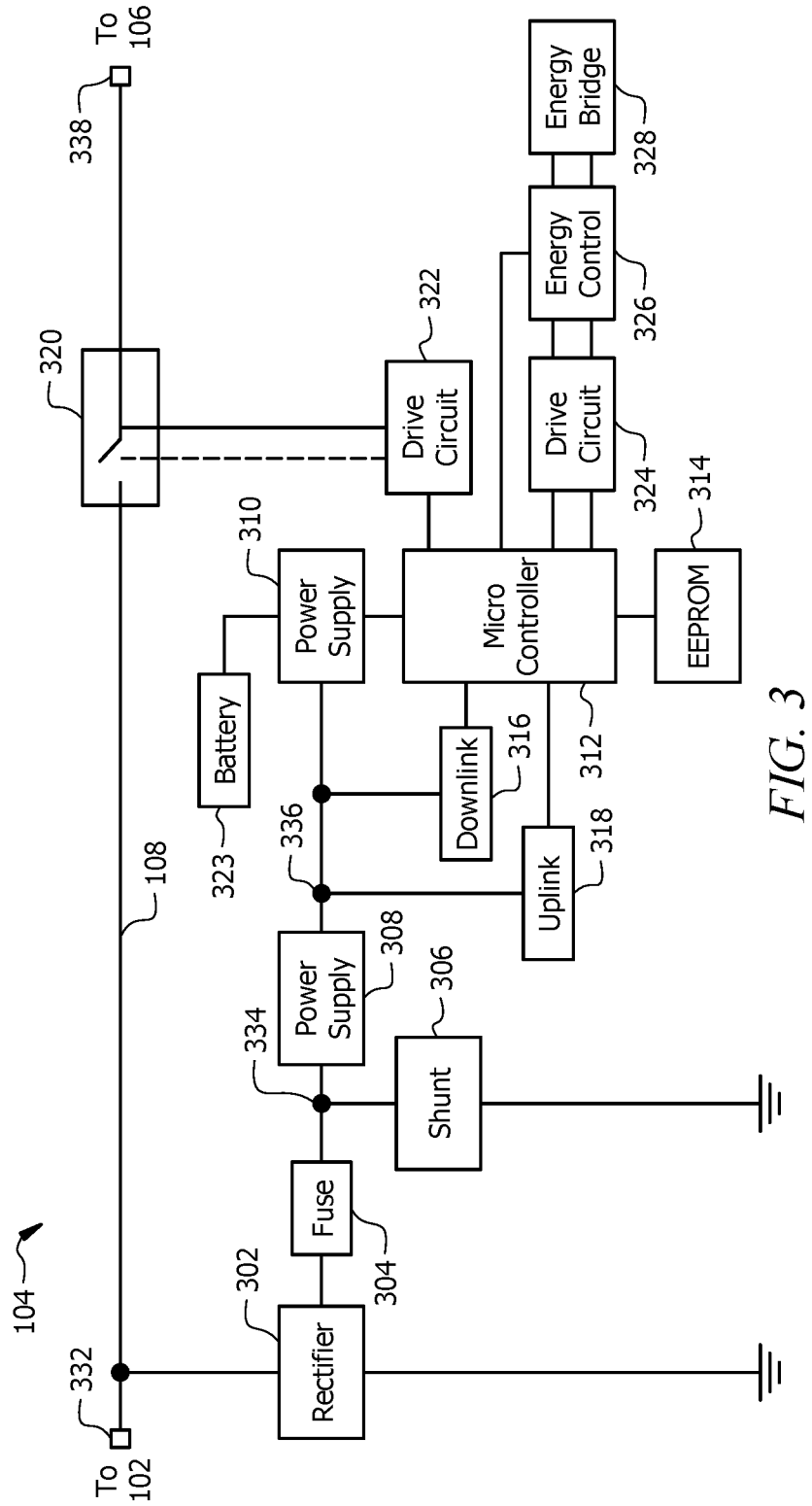
FIG. 3 is a block diagram of a remote device in accordance with various examples.

Referring now to FIG. 3, a block diagram of an example remote device 104 is shown in accordance with aspects of the disclosure. In at least some examples, the remote device 104 is referred to as a safety sub or a universal safety sub. The remote device 104, in at least some examples, includes a rectifier 302, optionally a fuse 304, a shunt 306, a power supply 308, a power supply 310, a microcontroller 312, an electrically erasable programmable read-only memory (EEPROM) 314, a downlink controller 316, an uplink controller 318, a switch circuit 320, a drive circuit 322, a drive circuit 324, an energy control circuit 326, and an energy bridge 328. In at least some examples, the remote device 104 also includes a battery 323.

In an example architecture of the remote device 104, the rectifier 302 is coupled between a terminal 332, configured to couple to a conductor of the wireline 108, and an armor, or sheathing, of the wireline 108 that functions as a chassis ground for the remote device 104. The rectifier 302 has an output coupled to a node 334. In some examples, the coupling is through the fuse 304. The shunt 306 is coupled between the node 334 and an earth ground. In some examples, the chassis ground may instead be replaced by the earth ground. The power supply 308 has an input coupled to the node 334 and an output coupled to a node 336. The power supply 310 has an input coupled to the node 336 and an output coupled to an input of the microcontroller 312. In example of the remote device 104 that include the battery 323, the power supply 310 may have a second input coupled to an output of the battery 323. The EEPROM 314 is coupled bidirectionally to the microcontroller 312. The downlink controller 316 is coupled between the node 336 and another input of the microcontroller 312. The uplink controller 318 is coupled between an output of the microcontroller 312 and the node 336. The switch circuit 320 is coupled in series between the terminal 332 and a terminal 338. The drive circuit 322 is coupled between another output of the microcontroller 312 and a control input of the switch circuit 320. The drive circuit 324 is coupled between another output of the microcontroller 312 and the energy control circuit 326. The energy control circuit 326 is coupled between the drive circuit 324 and the energy bridge 328.

In an example of operation of the remote device 104, a signal is received at the terminal 332. The signal is, in some examples, a power signal having a control signal superimposed on the power signal. In at least some examples, the signal received at the terminal 332 may have a voltage of up to about 1800 V or greater. Such a voltage may be received, for example, from a firing power supply or other device, component, or circuit configured to provide a high-voltage on the wireline. By default, the switch circuit 320 is configured to be open (e.g., normally open switch) to block the signal received at the terminal 332 from being passed to the terminal 338 without the microcontroller 312 permitting such signal passage. Thus, when the remote device 104 is not receiving power at the terminal 332, the switch circuit 320 is in an open state. The power signal is, in some examples, an AC signal. In other examples, the power signal is a DC signal.

The rectifier 302 receives the signal and rectifies the signal. The rectifier 302 may be of any suitable architecture, the scope of which is not limited herein. For example, the rectifier 302 may be any of a half-wave, full-wave, or bridge rectifier. Generally, the rectifier 302 provides a rectified signal to the fuse 304, if present, or the node 334 if the fuse 304 is not present, regardless of a polarity of the signal received at the terminal 332. The fuse 304, if present, is configured to prevent current exceeding a rating of the fuse 304 from damaging components of the remote device 104, such as the microcontroller 312. For example, the fuse 304 is configured to respond to a current flowing through the fuse 304 exceeding a rated value for the fuse 304 by creating an open circuit, or electrical disconnection, in the remote device in place of the fuse 304. The shunt 306 is configured to provide a low impedance path to the earth ground from the node 334 to further protect components of the remote device 104, such as the microcontroller 312, from damage resulting from high current or high voltage being present at the node 334. For example, the shunt 306 includes spark gaps that cause the fuse 304 to short in the event of an over voltage event and/or radio frequency (RF) circuitry to shunt RF waves that may be present at the terminal 332, preventing those RF waves from passing through the remote device 104 to the terminal 338.

The power supply 308 is, in some examples, configured to reduce a voltage of a signal received by the power supply 308 to about 12 V. In other examples, the power supply 308 may be configured to provide an output voltage of any suitable or programmed value. The power supply 308 is, in various examples, capable of withstanding input voltages of up to about 1800 V and operating with input voltages as low as about 18 V. The power supply 308 may have a linear architecture, a switching architecture, or any other suitable architecture, the scope of which is not limited herein. The power supply 310 is, in some examples, configured to generate a voltage for use by the microcontroller 312. In some examples, as will be used for discussion herein, that voltage is about 5 V. However, in other examples that voltage may be about 3.3 V, about 3 V, about 1.8 V, etc. In at least some examples, the power supply 310 is a linear power supply. In other examples, the power supply 310 has any suitable architecture, the scope of which is not limited herein.

When the microcontroller 312 receives power from the power supply 310, the microcontroller 312 powers on and queries the EEPROM 314 to determine a switch state for the switch circuit 320. The switch state, in at least some examples, indicates whether the microcontroller 312 was most recently controlling the switch circuit 320 to be open or closed. The microcontroller 312 also queries an internal memory of the microcontroller 312 for the switch state. When the internally stored switch state of the microcontroller 312 and the switch state as stored by the EEPROM 314 match, the microcontroller 312 provides control signals to the drive circuit 322 to return the switch circuit 320 to its prior switch state. After providing the control signals, the microcontroller 312 may wait to receive a command from the downlink controller 316, as will be further discussed below. When the internally stored switch state of the microcontroller 312 and the switch state as stored by the EEPROM 314 do not match, the microcontroller 312 provides control signals to the drive circuit 322 to maintain the switch circuit 320 in an open state. Further, when the internally stored switch state of the microcontroller 312 and the switch state as stored by the EEPROM 314 do not match, the microcontroller may transmit a response message to a control system, such as the control system 102 via the wirelines 108, each of FIG. 1, through the uplink controller 318, informing the control system of the mismatched switch states and/or actions taken by the microcontroller 312.

The downlink controller 316 monitors the node 336 to receive the control signal and provide data included in the control signal to the microcontroller 312. For example, the downlink controller 316 may detect the FSK or FSSK encoded pattern of the control signal and convert the FSK or FSSK encoded pattern to a series of binary data bits. The downlink controller 316 may provide the binary data bits to the microcontroller 312 and the microcontroller 312 may interpret the binary data bits as a command to be executed, based on a programmed routine, function, application, firmware, or other executable code of the microcontroller 312. The downlink controller 316 may detect the FSK or FSSK encoded pattern of the control signal and convert the FSK or FSSK encoded pattern to a series of binary data bits according to any suitable process and via any suitable hardware architecture, the scope of which is not limited herein.

Similarly, the microcontroller 312 may output a plurality of binary data bits to the uplink controller 318. Based on the binary data bits, the uplink controller 318 may modify a load placed on the node 336, which is reflected in a value of a load present at the terminal 332 and is visible by a control system, such as the control system 102 of FIG. 1, by viewing a change in voltage across a resistor, such as the resistor 218 of FIG. 2. The uplink controller 318 may modify the load placed on the node 336, in at least some examples, according to Manchester encoding such that the control system may detect and view a Manchester encoded pattern on a wireline coupled to the terminal 332. In other examples, the uplink controller 318 may modify the load placed on the node 336, in at least some examples, according to any suitable encoding scheme. In various examples, the uplink controller 318 may have any hardware architecture suitable for implementing an encoding scheme implemented by the uplink controller 318. The uplink controller 318 modifying the load by modulating a current present on the wireline by an amount in a range of about 25 milliamps to about 100 milliamps.

As described above, some examples of the remote device 104 include a battery 323. In such examples, the battery 323 provides power to the power supply 310 in the absence of a power signal being received at the terminal 332. The power supply 310 in turn provides power to the microcontroller 312 enabling a clock of the microcontroller 312 to remain operational. When the timer reaches a predetermined value, such as a predetermined amount of time since a last timer reset, which may occur each time a valid command is received by the remote device 104 (or at any other suitable time), the microcontroller 312 may enter a battery timer state. When the microcontroller 312 enters the battery timer state, the microcontroller 312 may shutdown the remote device 104, controlling the drive circuit 322 to control the switch circuit 320 to open and saving a switch state of open for the switch circuit 320 to the internal memory of the microcontroller 312 and the EEPROM 314.

Based on the control signals received from the microcontroller 312, the drive circuit 322 controls the switch circuit 320. In at least some examples, the switch circuit 320 includes at least one field-effect transistor, such as a n-channel silicon-carbide metal oxide semiconductor field-effect (NMOS) transistor implemented as a switch. In other examples, the field-effect transistor is of silicon, silicon-on-insulator, gallium-nitride, or any other suitable construction, process, chemistry, or process technology. The switch circuit 320 may include at least one NMOS transistor, controlled from the drive circuit 322 to facilitate bi-directional flow of current thought the switch circuit 320. To cause current to flow through an NMOS transistor, a value of a signal present at a gate terminal of the NMOS transistor must exceed a voltage present at a source terminal of the NMOS transistor by a threshold amount. Thus, to turn on the switch circuit 320, in some examples, the drive circuit 322 provides a voltage at the gate terminal of the NMOS transistor of the switch circuit 320 that is greater in value than a signal that is, or will be, present at the source terminal of the NMOS transistor of the switch circuit 320. However, as discussed above, the wireline 108 may carry high voltages of up to about 1800 V, or more. Therefore, in some circumstances, the drive circuit 322 may be required to provide a voltage greater than 1800 V at the gate terminal of the NMOS transistor of the switch circuit 320 to turn on the NMOS transistor and therefore turn on the switch circuit 320. Because the microcontroller 312 operates at a voltage of 5 V, and therefore drives the drive circuit 322 with a control signal having a value of no more than approximately 5 V, in some examples the drive circuit 322 is capable of providing a control signal to the switch circuit 320 having a voltage sufficient to cause the NMOS transistor of the switch circuit 320 to turn on in view of the voltages of up to about 1800 V on the wirelines 108. In some examples, the drive circuit 322 includes an air or iron core transformer driven by an amplifier or an open-drain transistor to control the switch circuit 320. The transformer may be a planar transformer, such as may be suitable for high voltage isolation. In other examples, the drive circuit 322 includes a switching element on a low side (e.g., ground potential side) of the drive circuit 322 such that the switching element is controllable via discrete semiconductor components.

In some examples, the microcontroller 312 receives an instruction to cause a detonator to fire or detonate, as described above. In response to the instruction, the microcontroller 312 may control the energy control circuit 326 to discharge energy to the energy bridge 328, causing the energy bridge 328 to interact with the detonator to fire the detonator. To store the energy for discharge in the energy control circuit 326, the drive circuit 324 may include components suitable for increasing a voltage of a signal received from the microcontroller 312. For example, the microcontroller 312 may provide the drive circuit 324 with a signal having a voltage of about 5 V, as described above. In some examples, the microcontroller 312 provides the signal to the drive circuit 324 responsive to the microcontroller 324 receiving a command to cause a detonation via the energy bridge 328. Based on the received signal, the drive circuit 324 may generate or otherwise provide a signal to the energy control circuit 326 that has a voltage greater than about 5 V. To increase the voltage of the received signal, in various examples the drive circuit 324 includes a voltage multiplier, a charge pump, an inductive coupler, a transformer, etc. The energy control circuit 326 may store energy received from the drive circuit 324 and, under control of the microcontroller 312, discharge the stored energy to the energy bridge 328. For example, the energy control circuit 326 may include an energy storage device such as one or more capacitors or one or more inductors to store the energy received from the drive circuit 324. The energy control circuit 326 may also include a switch or other controllable element to selectively discharge the energy storage device. In some examples, the switch is a semiconductor device, such as a transistor. Responsive to receipt of a control signal from the microcontroller 312, the switch may cause the energy storage device to discharge to the energy bridge 328. In at least some examples, the energy stored in the energy control circuit 326 is measurable to determine an amount of energy stored by the energy control circuit 326 and/or an amount of energy discharged by the energy control circuit 326 (e.g., such as to determine whether a commanded discharge and resulting initiation of a detonator was successful). The measuring may be performed according to any suitable process or via any suitable components, the scope of which is not limited herein.

In various examples, the energy bridge 328 is a metal-based electro deposition or electro etched structure fabricated on a PCB and suitable for facilitating energy dissipation. In other examples, the energy bridge 328 may be an exploding bridge wire (EBW) or an exploding foil initiator (EFI). In at least some examples, the energy bridge 328 is detachable or otherwise removable from the remote device 104. For example, the structure may be at least partially of copper, tin, gold, or another suitable metal having conductive properties. In some examples, the energy bridge 328 radiates energy based on energy received from the energy control circuit 326. The radiated energy may be in the form of heat. The heat may interact with a detonator or other device to initiate or fire a series of pyrotechnic events in a controlled energetic reaction. In other examples, the energy bridge 328 is, or includes, an electro-pyrotechnic initiator thin film chip (EPIC) resistor. The EPIC resistor may be based on a tantalum nitride (Ta2N) thin film technology, deposited on a ceramic substrate to facilitate and/or enhance energy dissipation. The EPIC resistor may convert electrical energy (e.g., such as current received from the energy control circuit 326) into heat energy according to an electrothermal profile. The heat may interact with a detonator or other device to initiate or fire a series of pyrotechnic events in a controlled energetic reaction. In another example, the energy bridge 328 may include a projectile that, responsive to the energy bridge 328 becoming energized, is launched and strikes a secondary explosive charge that interacts with a detonator or other device to initiate or fire a series of pyrotechnic events in a controlled energetic reaction.

Figure 4:
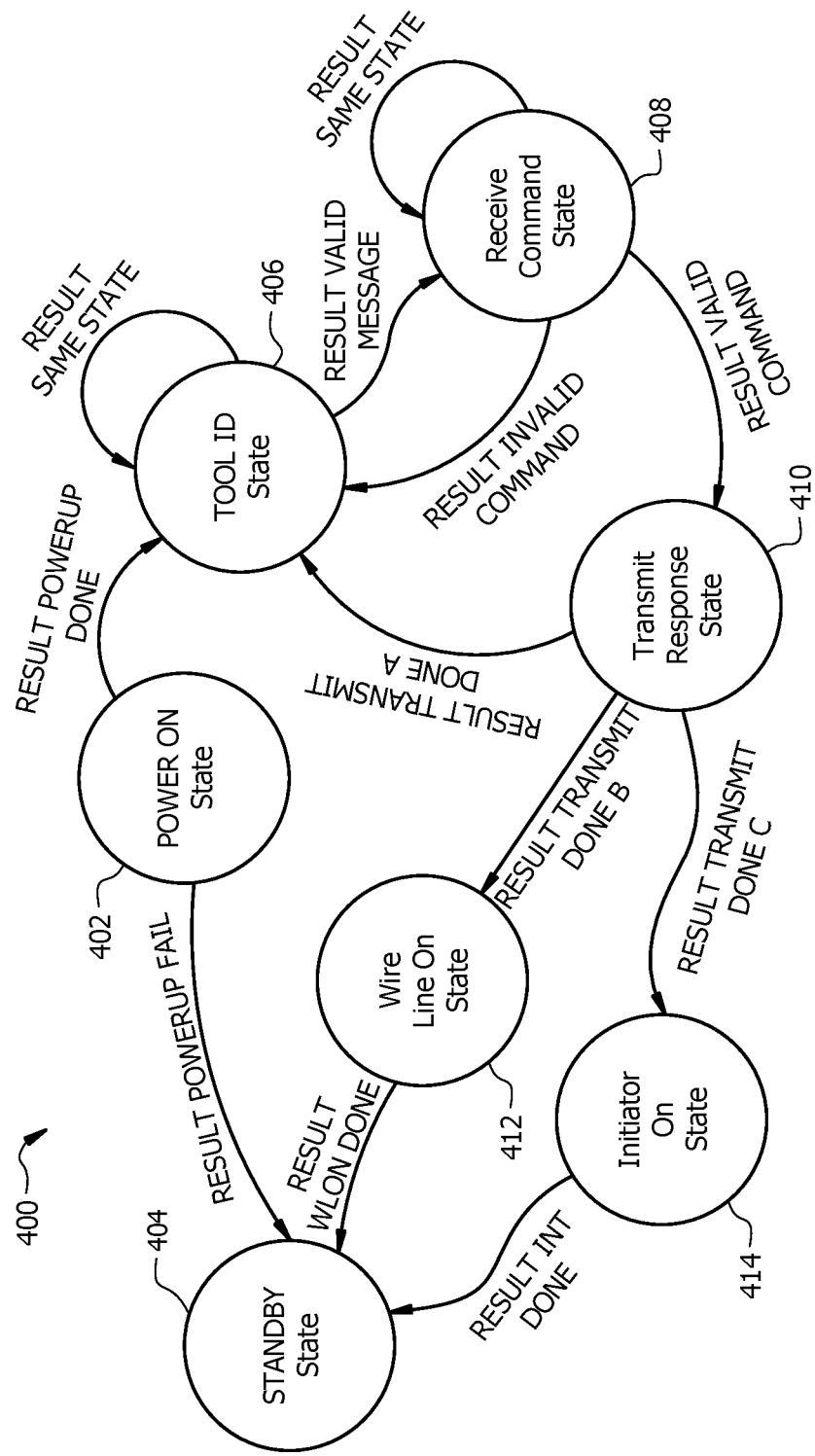
FIG. 4 is a state diagram of a state machine in accordance with various examples.

Referring now to FIG. 4, a state diagram of a state machine 400 is shown in accordance with aspects of the disclosure. In at least some examples, the state machine 400 is implemented by the remote device 104, such as by the microcontroller 312, as discussed elsewhere herein. The state machine 400 is implemented to, in some examples, to receive commands from a control system and perform actions responsive to the commands.

At state 402, responsive to application of power to the microcontroller 312, the state machine 400 reads switch states from the EEPROM 314 and the internal memory of the microcontroller 312. When the switch states read from the EEPROM 314 and the internal memory of the microcontroller 312 do not match or are otherwise unavailable or invalid, the state machine 400 proceeds to state 404 and remains at state 404 until being power cycled. When the switch states read from the EEPROM 314 and the internal memory of the microcontroller 312 match, the state machine 400 controls the drive circuit 322 to control the switch circuit 320 to place the switch circuit 320 in the read switch state and then proceeds to state 406.

Alternatively, if the state machine 400 determines at state 402 that a timer has expired (e.g., such as indicating an amount of time greater than a threshold passing since last receipt of a command), the state machine 400 proceeds to a state at which a programmed action is performed. In at least some examples, that programmed action is a safe shutdown of the remote device 104 in which the switch circuit 320 is controlled to open. In at least some examples, the state machine 400 remains at this state until a command is received or, if operating on battery power, power other than battery power is again applied to the microcontroller 312.

At state 406, the state machine 400 waits to receive a tool identifier. The tool identifier is, in some examples, an identifier of a downstream tool to which the remote device 104 is blocking the transfer of power from the control system and/or which the remote device 104 is to interact with to control (e.g., such as to cause a detonation, as described above). The tool identifier is received, in some examples, from the downlink controller 416 based on a FSK or FSSK encoded control signal received from a control system and decoded by the downlink controller 316 to binary bits that are provided to the microcontroller 312 and state machine 400. When the tool identifier is invalid, the state machine 400 remains at the state 406. When the tool identifier is valid, the state machine 400 proceeds to state 410.

At state 408, the state machine 400 waits to receive a command. The command is, in some examples, a command to provide power to the tool identified by the tool identifier, to interact with the tool identified by the tool identifier, to cause a detonation in, by, or of the tool identified by the tool identifier, or the like. In other various examples, the command is any suitable command for which the microcontroller 312 and/or state machine 400 are programmed. The command is received, in some examples, from the downlink controller 316 based on a FSK or FSSK encoded control signal (either the same control signal as at state 406 or a new control signal) received from the control system and decoded by the downlink controller 316 to binary bits that are provided to the microcontroller 312 and state machine 400. When no command has yet been received, the state machine 400 remains at the state 408. When the command is invalid, the state machine 400 controls the uplink controller 318 to transmit a response to the control system indicating that an invalid command was received and then proceeds back to the state 406. When the command is valid, the state machine 400 proceeds to state 410.

At state 410, the state machine 400 executes the command received at state 410. In some examples, executing the command includes communicating with a downstream device and waiting for a response from the downstream device. In other examples, executing the command includes controlling the drive circuit 322 to control the switch circuit 320 to place the switch circuit 320 in a state indicated by the command. In other examples, executing the command includes controlling the energy control circuit 326 to discharge energy to, or via, the energy bridge 328. After executing the command, the state machine 400 controls the uplink controller 318 to transmit a response associated with the command to the control system and then proceeds to another state. A state to which the state machine 400 proceeds from the state 410 may be determined based on the command received at the state 408. In some examples, the state machine 400 proceeds from the state 410 to the state 406. In other examples, such as responsive to the command being to control the switch circuit 320 to place the switch circuit 320 in a state indicated by the command, the state machine proceeds from state 410 to state 412. In other examples, such as responsive to the command being to control the energy control circuit 326 to discharge energy to, or via, the energy bridge 328, the state machine 400 proceeds from the state 410 to the state 414.

At state 412, the state machine 400 provides control signals, via the microcontroller 312, to the drive circuit 322 to cause the drive circuit 322 to control the switch circuit 320 to turn on, such as in a manner described above with respect to FIG. 3. Subsequently, the state machine 400 proceeds from state 412 to state 404.

At state 414, the state machine 400 provides control signals to cause the radiation of heat by the energy bridge 328. For example, the state machine 400 may cause the microcontroller 312 to provide a control signal to the drive circuit 324. The control signal may the drive circuit 324 to provide a signal to the energy control circuit 326 for charging the energy control circuit 326. The state machine 400 may further, via the microcontroller 312, to the energy control circuit 326 to cause the energy control circuit 326 to discharge the stored energy via the energy bridge 328. For example, the state machine 400 may provide control signals to the energy control circuit 326 that cause a switch of the energy control circuit 326 to open, facilitating the transfer of current from the energy control circuit 326 to the energy bridge 328. The energy may be dissipated or radiated by the energy bridge 328 in the form of heat. The heat may cause the initiation, firing, detonation, or otherwise activation of another device, such as a downstream device or a detonator.

Various systems and methods associated with control devices, fuzing devices, detonator firing, and downhole systems are described herein. Certain aspects of a fuzing device can include, but are not limited to:

In a first aspect, a fuzing device includes an energy bridge, an uplink controller, a downlink controller, and a microcontroller. The microcontroller is coupled to the energy bridge, the uplink controller, and the downlink controller. The microcontroller is configured to receive downlink messages from a control unit via the downlink controller, selectively power the energy bridge according to at least some of the downlink messages to initiate a controlled energetic reaction, and send uplink messages to the control unit via the uplink controller.

A second aspect can include the fuzing device of the first aspect, wherein the energy bridge, the uplink controller, the downlink controller, and the microcontroller are all disposed on a common circuit board.

A third aspect can include the fuzing device of the first or second aspects, the fuzing device further including a drive circuit coupled to the microcontroller; and an energy control circuit coupled to the drive circuit and the energy bridge.

A fourth aspect can include the fuzing device of the third aspect, wherein the drive circuit comprises a circuit configured to increase a voltage from the microcontroller and store the voltage as energy.

A fifth aspect can include the fuzing device of the fourth aspect, wherein the drive circuit comprises an inductor, capacitor, or a combination thereof.

A sixth aspect can include the fuzing device of the fourth aspect, wherein the drive circuit comprises a voltage multiplier, charge pump, or inductive coupler.

A seventh aspect can include the fuzing device of any one of the third through sixth aspects, wherein the energy control circuit comprises an energy storage device and a semiconductor transistor.

An eighth aspect can include the fuzing device of the seventh aspect, wherein the energy storage device comprises an inductor, a capacitor, or a combination thereof.

A ninth aspect can include the fuzing device of the seventh or eighth aspects, wherein the semiconductor transistor is configured to control a discharge of energy stored in the energy storage device to the energy bridge.

A tenth aspect can include the fuzing device of the ninth aspect, wherein an amount of energy stored in the energy storage device is measurable, and wherein the microcontroller transmits an indication of the amount of energy to the control unit via uplink messages sent through the uplink controller.

An eleventh aspect can include the fuzing device of any one of the ninth through tenth aspects, further comprising a second drive circuit configured to control power provided to a wireline coupled to the fuzing device.

A twelfth aspect can include the fuzing device of the eleventh aspect, wherein the second drive circuit comprises an air or iron core transformer driven by an amplifier or an open drain transistor.

A thirteenth aspect can include the fuzing device of the eleventh aspect, wherein the second drive circuit comprises a switching element coupled to a low side of the second drive circuit such that it is controllable via discrete semiconductor components.

A fourteenth aspect can include the fuzing device of the eleventh aspect, further comprising a switching element coupled to the wireline and controllable by the second drive circuit, wherein power is provided to the wireline coupled to the fuzing device based on a switching state of the switching element.

A fifteenth aspect can include the fuzing device of any one of the first though fourteenth aspects, further comprising: a first power supply; and a second power supply, wherein the second power supply is in signal communication with the first power supply.

A sixteenth aspect can include the fuzing device of the fifteenth aspect, wherein the first power supply is a linear power supply or a switching power supply capable of withstanding up to 1700 V and providing a useable voltage for digital and analog circuits.

A seventeenth aspect can include the fuzing device of the fifteenth or the sixteenth aspects, wherein the second power supply is a linear power supply or a switching power supply configured to reduce an intermediate voltage from the first power supply to one useable by the microcontroller.

An eighteenth aspect can include the fuzing device of any one of the first through seventeenth aspects, wherein the energy bridge is a metal element disposed on a printed circuit board.

A nineteenth aspect can include the fuzing device of any one of the first through eighteenth aspects, wherein selectively powering the energy bridge according to at least some of the downlink messages includes providing an amount of energy to the energy bridge, and wherein the energy bridge converts the provided energy to heat and radiates the heat to initiate the controlled energetic reaction.

Certain aspects of a method can include, but are not limited to:

In a first aspect, a method includes receiving, via a downlink controller, downlink messages from a control unit, the downlink messages including a command; responsive to the command, charging an energy storage element; selectively discharging the energy storage element through an energy bridge; and sending, via an uplink controller, uplink messages to the control unit.

A second aspect can include the method of the first aspect, wherein selectively discharging the energy storage element includes providing energy from the energy storage element to the energy bridge.

A third aspect can include the method of the first or second aspects, wherein providing energy to the energy bridge causes the energy bridge to convert the energy to heat and radiate the heat.

A fourth aspect can include the method of any one of the first through third aspects, wherein radiating the heat causes the energy bridge to initiate a controlled energetic reaction.

A fifth aspect can include the method of the fourth aspect, wherein providing energy to the energy bridge causes the energy bridge to launch a projectile configured to impact a secondary explosive that initiates a controlled energetic reaction.

In the foregoing discussion and in the claims, the terms "including" and "comprising" are used in an open-ended fashion, and thus mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

What is claimed is:

1. A fuzing device, comprising:
 an energy bridge, wherein the energy bridge is configured to convert energy to heat and initiate a controlled energetic reaction;
 an uplink controller;
 a downlink controller; and
 a microcontroller coupled to the energy bridge, the uplink controller, and the downlink controller, the microcontroller configured to:
  receive downlink messages from a control unit via the downlink controller;
  selectively power the energy bridge according to at least some of the downlink messages to initiate the controlled energetic reaction; and
  send uplink messages to the control unit via the uplink controller, wherein the energy bridge, the uplink controller, the downlink controller, and the microcontroller are all disposed on a common circuit board.

2. The fuzing device of claim 1, further comprising:
 a drive circuit coupled to the microcontroller; and
 an energy control circuit coupled to the drive circuit and the energy bridge.

3. The fuzing device of claim 2, wherein the drive circuit comprises a circuit configured to increase a voltage from the microcontroller and store the voltage as energy, wherein the energy control circuit comprises an energy storage device, and wherein the energy storage device comprises an inductor, a capacitor, or a combination thereof.

4. The fuzing device of claim 3, wherein the drive circuit comprises an inductor, a capacitor, a voltage multiplier, a charge pump, an inductive coupler, or a combination thereof.

5. The fuzing device of claim 2, wherein the energy control circuit comprises an energy storage device and a semiconductor transistor.

6. The fuzing device of claim 5, wherein the semiconductor transistor is configured to control a discharge of energy stored in the energy storage device to the energy bridge.

7. The fuzing device of claim 5, wherein an amount of energy stored in the energy storage device is measurable, and wherein the microcontroller is configured to transmit an indication of the amount of energy to the control unit via the uplink messages sent through the uplink controller.

8. The fuzing device of claim 1, further comprising a second drive circuit configured to control power provided to a wireline coupled to the fuzing device.

9. The fuzing device of claim 8, wherein the second drive circuit comprises an air or iron core transformer driven by an amplifier or an open drain transistor, or wherein the second drive circuit comprises a switching element coupled to a low side of the second drive circuit such that it is controllable via discrete semiconductor components.

10. The fuzing device of claim 8, further comprising a switching element coupled to the wireline and controllable by the second drive circuit, wherein power is provided to the wireline coupled to the fuzing device based on a switching state of the switching element.

11. The fuzing device of claim 1, further comprising:
a first power supply; and
a second power supply, wherein the second power supply is in signal communication with the first power supply.

12. The fuzing device of claim 11, wherein the first power supply is a linear power supply or a switching power supply capable of withstanding up to 1700 V and providing a useable voltage for digital and analog circuits.

13. The fuzing device of claim 12, wherein the second power supply is a linear power supply or a switching power supply configured to reduce an intermediate voltage from the first power supply to one useable by the microcontroller.

14. The fuzing device of claim 1, wherein the energy bridge is a metal element disposed on a printed circuit board.

15. The fuzing device of claim 1, wherein selectively powering the energy bridge according to at least some of the downlink messages includes providing an amount of energy to the energy bridge, and wherein the energy bridge converts the provided energy to heat and radiates the heat to initiate the controlled energetic reaction.

16. A method, comprising:
receiving, via the downlink controller of the fuzing device of claim 1, downlink messages from the control unit, the downlink messages including a command;
responsive to the command, charging an energy storage element;
selectively discharging the energy storage element through the energy bridge; and
sending, via the uplink controller, the uplink messages to the control unit.

17. The method of claim 16, wherein selectively discharging the energy storage element includes providing energy from the energy storage element to the energy bridge.

18. The method of claim 17, wherein providing energy to the energy bridge causes the energy bridge to convert the energy to heat and radiate the heat, and wherein radiating the heat causes the energy bridge to initiate the controlled energetic reaction.

19. The method of claim 17, wherein providing energy to the energy bridge causes the energy bridge to launch a projectile configured to impact a secondary explosive that initiates the controlled energetic reaction.

* * * * *